United States Patent Office 3,541,087
Patented Nov. 17, 1970

3,541,087
PREPARATION OF CYCLIC CARBONATES FROM ACETYLENIC GLYCOLS
Robert J. Tedeschi, Whitehouse Station, and George L. Moore, South Plainfield, N.J., assignors to Air Reduction Company, Incorporated, New York, N.Y., a corporation of New York
No Drawing. Filed June 29, 1967, Ser. No. 649,816
Int. Cl. C07d *13/06*
U.S. Cl. 260—240                                      5 Claims

ABSTRACT OF THE DISCLOSURE

Acetylenic carbonates:

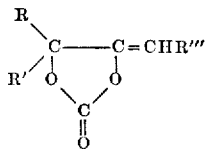

are produced by reacting acetylenic glycols with liquid carbon dioxide in the presence of a suitable catalyst, the acetylenic glycols used in the reaction having the formula

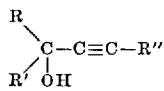

wherein R and R', which may be the same or different, are alkyl groups, e.g. lower alkyl groups containing up to six carbon atoms, which may be separate groups or which may be joined to form a ring structure, cycloalkyl of 6 to 12 carbon atoms, e.g. cyclohexyl, aryl and alkaryl containing up to 12 carbon atoms, such as phenyl and tolyl, R" is a radical selected from the group consisting of

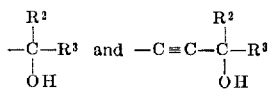

wherein $R^2$ and $R^3$, which may be the same or different, have the same meanings as R and R', and R''' is selected from the group consisting of

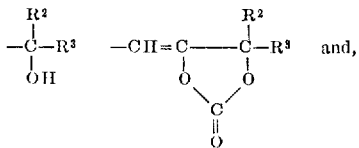 and, when $R^2$ is methyl,

---

This invention is concerned with the preparation of cyclic carbonates and is more particularly concerned with the formation of cyclic carbonates from acetylenic glycols.

Simple cyclic carbonates, such as ethylene and propylene carbonates, have been prepared by reacting the corresponding cyclic oxides with carbon dioxide in the presence of various catalysts, as shown, for example, in McClellan U.S. 2,873,282 and Dunn U.S. 2,773,881. Dimroth et al. U.S. 3,082,216 which issued Mar. 19, 1963, shows the preparation of cyclic carbonates from certain tertiary acetylenic alcohols. In these reactions, use has been made of gaseous carbon dioxide and these prior processes have involved the use of relatively elevated temperatures, and the necessary relatively high pressures have complicated equipment requirements. Furthermore, the number of cyclic carbonates which have been prepared by the use of gaseous carbon dioxide has been limited.

It is an object of this invention to provide an improved method of producing cyclic carbonates.

It is another object of the invention to provide a process by means of which a variety of novel cyclic carbonates can be produced.

It is a further object of the invention to provide a method of the character indicated which avoids the necessity of using high pressures and temperatures.

It is a still further object of the invention to provide a process which permits the production of cyclic carbonates in a form which can be easily handled for recovery of the products without necessitating the use of special solvents.

It is another object of the invention to provide a new class of cyclic carbonates.

In accordance with the invention, cyclic carbonates having the formula

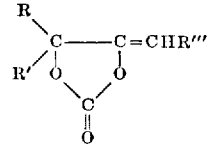

are produced by reacting acetylenic glycols with liquid carbon dioxide in the presence of a suitable catalyst, the acetylenic glycols used in the reaction having the formula

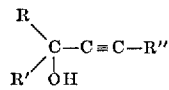

wherein R and R', which may be the same or different, are alkyl groups, e.g. lower alkyl groups containing up to six carbon atoms, which may be separate groups or which may be joined to form a ring structure, cycloalkyl of 6 to 12 carbon atoms, e.g. cyclohexyl, aryl and alkaryl containing up to 12 carbon atoms, such as phenyl and tolyl, R" is a radical selected from the group consisting of

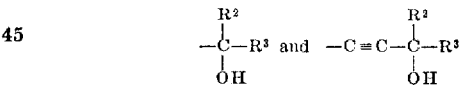

wherein $R^2$ and $R^3$, which may be the same or different, have the same meanings as R and R', and R''' is selected from the group consisting of

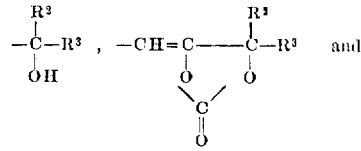 and when $R^2$ is methyl,

Typical representative glycols which can be used in the process of this invention are, when R" is

2,5-dimethyl-3-hexyn-2,5-diol
2,5-dimethly-3-heptyn-2,5-diol
3,6-dimethyl-4-nonyn-3,6-diol
2,5-dimethyl-3-nonyl-2,5-diol 2,5,7-trimethyl-3-nonyn-2,5-diol
2,5-dimethyl-3-undecyn-2,5-diol
2-cyclohexyl-5-methyl-3-hexyn-2,5-diol
2,5-dicyclohexyn-3-hexyn-2,5-diol
2-phenyl-5-methyl-3-hexyn-2,5-diol and when R″ is

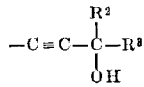

2,7-dimethyl-2,5-octadiyn-2,7-diol
2,7-dimethyl-2,5-nonadiyn-2,7-diol
3,8-dimethyl-4,6-undecadiyn-3,8-diol
2,7-dimethyl-2,5-undecadiyn-2,7-diol
2,7,9-trimethyl-2,5-undecadiyn-2,7-diol
2,7-dimethyl-2,5-tridecadiyn-2,7-diol
2-methyl-7-cyclohexyl-2,5-octadiyn-2,7-diol
2,7-dicyclohexyn-2,5-octadiyn-2,7-diol
2-methyl-7-phenyl-2,5-octadiyn-2,7-diol Typical cyclic carbonates which can be produced by the process of this invention include, of the formula

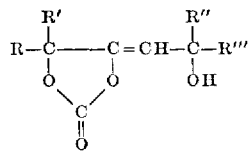

4,4-dimethyl-5(2-hydroxy-2-methylpropylidenyl)-1,3-dioxolan-2-one
4-methyl-4-ethyl-5(2-hydroxy-2-methylpropylidenyl)-1,3-dioxolan-2-one
4-methyl-4-ethyl-5(4-hydroxy-4-methylpentylidenyl)-1,3-dioxolan-2-one
4-n-butyl-4-methyl-5(2-hydroxy-2-methylpropylidenyl)-1,3-dioxolan-2-one
4-methyl-4(2-methylbutyl)-5(2-hydroxy-2-methylpropylidenyl)-1,3-dioxolan-2-one
4-methyl-4-n-hexyl-5(2-hydroxy-2-methylpropylidenyl)-1,3-dioxolan-2-one
4-methyl-4-cyclohexyl-5(2-hydroxy-2-methylpropylidenyl)-1,3-dioxolan-2-one
4-methyl-4-cyclohexyl-5(2-hydroxy-2-cyclohexylpropylidenyl)-1,3-dioxolan-2-one
4,4-dimethyl-5-(2-hydroxy-2-phenylpropylidenyl)-1,3-dioxolan-2-one of the formula

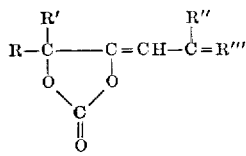

4,4-dimethyl-5(2-isobutenylidenyl)-1,3-dioxolan-2-one
4-methyl-4-ethyl-5(2-isobutenyltidenyl)-1,3-dioxolan-2-one
4-methyl-4-ethyl-5(2-methyl-2-pentenylidenyl)-1,3-dioxolan-2-one
4-methyl-4-n-butyl-5(2-isobutenylidenyl)-1,3-dioxolan-2-one
4-methyl-4(2-methylbutyl)-5(2-isobutenylidenyl)-1,3-dioxolan-2-one
4-methyl-4-n-hexyl-5(2-isobutenylidenyl)-1,3-dioxolan-2-one
4-methyl-4-cyclohexyl-5(2-idobutenylidenyl)-1,3-dioxolan-2-one
4-methyl-4-cyclohexyl-5(2-cyclohexyl-2-propenylidenyl)-1,3-dioxolan-2-one 4,4-dimethyl-5(2-phenyl-2-propenylidenyl)-1,3-dioxolan-2-one of the formula

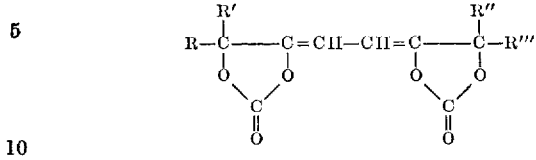

bis(5,5-dimethyl-3-oxy-2,4-dioxacyclopentylidenyl)ethane
1-(5-methyl-5-ethyl-3-oxy-2,4-dioxacyclopentylidenyl)-2(5,5-dimethyl-3-oxy-2,4-dioxacyclopentylidenyl)ethane
1-(5-methyl-5-ethyl-3-oxy-2,4-dioxacyclopentylidenyl)-2-(5-methyl-5-propyl-3-oxy-2,4-dioxacyclopentylidenyl)ethane
1-(5-methyl-5-n-butyl-3-oxy-2,4-dioxacyclopentylidenyl)-2-(5,5-dimethyl-3-oxy-2,4-dioxacyclopentylidenyl)ethane
1-[5-methyl-5(2-methylbutyl)-3-oxy-2,4-dioxacyclopentylidenyl]-2-(5,5-dimethyl-3-oxy-2,4-dioxacyclopentylidenyl)ethane
1-(5-methyl-5-n-hexyl-3-oxy-2,4-dioxacyclopentylidenyl)-2-(5,5-dimethyl-3-oxy-2,4-dioxacyclopentylidenyl)ethane
1-(5-methyl-5-cyclohexyl-3-oxy-2,4-dioxacyclopentylidenyl)-2(5,5-dimethyl-3-oxy-2,4-dioxacyclopentylidenyl)ethane
bis(5-cyclohexyl-5-methyl-3-oxy-2,4-dioxacyclopentylidenyl)ethane
1-(5,5-dimethyl-3-oxy-2,4-dioxacyclopentylidenyl)-2(5-methyl-5-phenyl-3-oxy-2,4-dioxacyclopentylidenyl)ethane The use of liquid carbon dioxide surprisingly results in the production of cyclic carbonates in good yields yet the reaction can be carried out at ordinary temperatures, e.g. at substantially room temperature, such as temperatures of 20–35° C., and without the need for excessive carbon dioxide pressures, the pressure prevailing being merely that of liquid carbon dioxide at about room temperature. A particularly surprising feature of the invention is that the use of liquid carbon dioxide results in a high speed of reaction yet high yields are consistently obtained.

In carrying out the reaction, the acetylenic glycol is charged to a suitable reaction vessel and liquid carbon dioxide is then introduced to provide at least a stoichiometric quantity based upon the acetylenic glycol, although excess liquid carbon dioxide, e.g. up to 50% excess, can be employed. Actually, the amount of the excess of carbon dioxide is not important but there is no particular advantage in using any substantial excess since only the stoichiometric quantity will react with the acetylenic glycol being employed.

While the reaction can be carried out in the presence of added solvents, the reaction is preferably carried out in bulk, i.e. the acetylenic glycols, the liquid carbon dioxide and the reaction products are solvents for each other. When an added solvent is used, particularly in the case of the more complex acetylenic glycols, an inert hydrocarbon solvent, such as hexane, or the like, can be employed, and polar solvents should be avoided.

As the catalyst for the reaction, there is most advantageously employed a mixture of a tertiary aliphatic amine, such as triethylamine, and a copper salt such as cuprous chloride, e.g. in the amount of 2 to 10% by weight of each based on the acetylenic glycol. In general, the catalysts disclosed in U.S. 3,082,216 can be used.

The invention will now be described by reference to the following specific examples of practical application. In the examples, all parts are by weight unless otherwise indicated.

EXAMPLE I

Formation of 4,4-dimethyl-5-(2-methyl-2-propenylidenyl)-1,3-dioxolan-2-one

The reactor employed was a 1-liter, stainless-steel autoclave equipped with stirrer, thermocouple well, internal water-cooling coil, and a calibrated buret from which the liquid $CO_2$ was added. The reactor charge was placed in a stainless-steel liner which fitted snugly in the autoclave. The following materials, in the quantities indicated, were employed in the reaction:

Dimethyl hexynediol—75 g. (0.53 mole)
Cuprous chloride—4 g.
Triethylamine—6 g. (7.4 ml.)
Liquid $CO_2$—280 ml.

The dimethyl hexynediol, the cuprous chloride, and the triethylamine were charged in the autoclave. After purging and pressure testing with nitrogen, the addition of liquid $CO_2$ from the liquid buret was started. The $CO_2$ was forced into the autoclave with about 900 p.s.i.g. nitrogen pressure and the rate of $CO_2$ introduction was controlled by means of a needle valve. The addition was completed in 25 min., accompanied by a $CO_2$ pressure increase to 775 p.s.i.g. The temperature during $CO_2$ addition was maintained near 20° C. by occasional cooling. After completing $CO_2$ addition, the mixture was stirred for a total reaction time of 10 hours. The temperature ranged from 20–32° C. and the pressure ranged from 535 to 800 p.s.i.g.

After bleeding off $CO_2$, the reaction mixture was warmed in a water bath to melt the solid cyclic carbonate and was then filtered. The weight of crude product was 105.6 g.

The product was transferred with water and diethyl ether to a continuous extractor. The ether extracts were evaporated in a stream of $N_2$, followed by distillation of the residue. The distillate was collected at 82–88°/0.8 mm. Hg. The 69 g. of cyclic carbonate collected represented a 79% conversion, or an 86% yield.

Calcd. (percent): C, 64.2; H, 7.1; O, 28.5. Found (percent): C, 63.7; H, 5.7; O, 29.6.

This product has the formula:

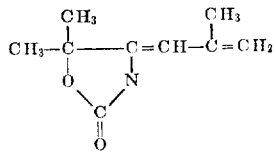

Infrared absorption confirmed the cyclic carbonate structure with one ring carbon attached to an external group through a double bond. The diene structure was proved by hydrolyzing the cyclic carbonate as follows:

A mixture of the product 4,4-dimethyl-5-(2-methyl-2-propenylidenyl)-1,3-dioxolan-2-one (20 g.), water (20 g.), and potassium carbonate (0.5 g.) was stirred 10 hr. at reflux temperature. After cooling, water (20 ml.) and diethyl ether (20 ml.) were added, the mixture was stirred a few minutes and filtered. The ether layer was separated, and the aqueous layer was extracted further with small portions of ether.

After distilling ether and water from the extracts, 8.5 g. of product (B.P. 39° C./1 mm.) was collected, representing a 50% conversion to 2,5-dimethyl-5-hydroxy-1-hexen-4-one. The still pot contained 5.6 g. of material which was mainly starting cyclic carbonate.

The hydrolysis product was 98% pure according to vapor phase chromatography. Infrared absorption showed the characteristic bands for OH, C=O, and the terminal double bond.

EXAMPLE II

The procedure of Example I was repeated but 6.7 g. of N-methyl pyrrolidine was used instead of triethyl amine as the catalyst. The product was obtained in 73% conversion.

EXAMPLE III

Formation of 4,4-dimethyl-5-(2-methyl-2-hydroxy propylidenyl)-1,3-dioxolan-2-one Dimethyl hexynediol—75 g. (0.53 mole)
Cuprous chloride—4 g.
Triethylamine—6 g. or (7.4 ml.)
"Pure Carbonic" liquid $CO_2$—400 ml.

After combining the materials as described in Example I, they were stirred 10 hrs. at 22–25° C. The crude product (114 g. brown liquid) was taken up in ether and water and the organic material extracted continuously with ether.

The extracts were evaporated in a stream of $N_2$. The liquid residue was dissolved in 150 ml. of methanol followed by addition of Norit-A (5 g.). After stirring 2 hrs. at room temperature and filtering from the carbon, volatile material was stripped from the filtrate at 30–43° C. (water bath temp.) while lowering the pressure slowly from 150–0.5 mm. A 93% conversion to a clear, pale yellow product was obtained.

This product has the formula:

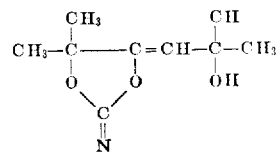

Infrared absorption substantiated the product, as did the carbon, hydrogen and oxygen determination:

Calcd. (percent): C, 58.1; H, 7.52; O, 34.4. Found (percent): C, 57.8; H, 7.66; O, 35.0.

A mixture of the cyclic carbonate (20 g.), water (20 g.) and $K_2CO_3$ (1 g.) was stirred at reflux for 10 hrs. After cooling, the mixture was diluted with water and extracted continuously with ether.

After removing ether and water, the product (8.4 g.) distilled at 69–72° C./0.75 mm. The conversion to 2,5-dimethyl-2,5-dihydroxy-3-hexanone was 48%. The structure was verified by infrared analysis and by oxygen determination (30.4%).

EXAMPLE IV

Formation of bis(5,5-dimethyl-3-oxy-2,4-dioxa-cyclopentylidenyl) ethane

Dimethyl octadiynediol (recrystd. from toluene)—60 g. (0.36 mole)
Cuprous chloride—4 g.
Triethylamine—6. (7.4 ml.)
"Pure Carbonic" liquid $CO_2$—420 ml.

The materials were combined as described in Example I, and stirred 10 hrs. at 23–30° C. and 880–920 p.s.i.g.

The crude product (103 g.) was transferred to a Buchner funnel and washed 2 times with hexane. Next it was washed with 3 portions of cold dimethyl carbonate (evaporation of the washings left 8.7 g. of a dark viscous oil).

The washed product was placed in 800 ml. of dimethyl carbonate, heated to boiling, and filtered hot (5.2 g. insoluble material were removed). The filtrate was cooled to 10° C. followed by filtering the precipitate and washing once with cold dimethyl carbonate. The cyclic dicarbonate, after drying in a vacuum oven at 75° C., weighed 70.1 g. and melted 203–204° C. with decomposition.

Another 10 g. of product were isolated by concentrating the above mother liquors. A conversion of approximately 85% was obtained.

This product has the formula:

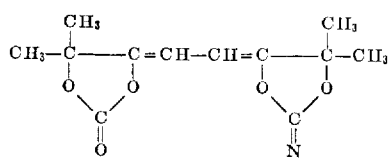

The structure of the product was verified by infrared analysis and carbon, hydrogen and oxygen determination:

Calcd. (percent): C, 56.7; H, 5.5; O, 37.8. Found (percent): C, 55.85; H, 5.55; O, 37.66.

The novel cyclic carbonates produced in accordance with this invention are useful for the preparation of polycarbonates and are useful cross-linking agents, monomers and chemical intermediates, and they can also be polymerized with vinyl monomers, such as vinyl acetate to form co-polymers useful in the fabrication of plastic sheets, fibers, foams, etc.

It will be understood that various changes and modifications can be made without departing from the invention as above described, and without departing from the invention as defined in the appended claims. It is intended, therefore, that all matter contained in the foregoing description shall be interpreted as illustrative only and not as limitative of the invention.

What is claimed is:

1. In the process of producing a cyclic carbonate of the formula

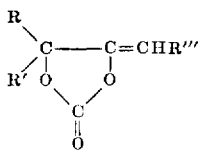

by reacting carbon dioxide in a reaction zone with an acetylenic glycol of the formula

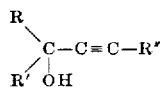

wherein R and $R_2$ are the same or different and are alkyl groups containing up to 6 carbon atoms, cycloalkyl groups of 6 to 12 carbon atoms aryl groups containing up to 12 carbon atoms, or alkaryl groups containing up to 12 carbon atoms, R'' is a radical selected from the group consisting of

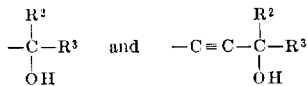

wherein $R^2$ and $R^3$, which may be the same or different, have the same meanings as R and R', and R''' is selected from the group consisting of

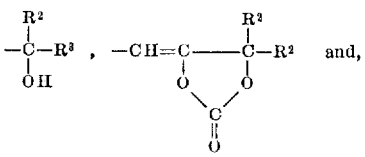

when $R^2$ is methyl,

the improvement which comprises introducing said carbon dioxide into said reaction zone in liquid form and reacting the liquid carbon dioxide with said acetylenic glycol.

2. A process as defined in claim 1, wherein the reaction is carried out in the persence of a catalyst which comprises a tertiary aliphatic amine and a copper salt.

3. A cyclic carbonate of the formula

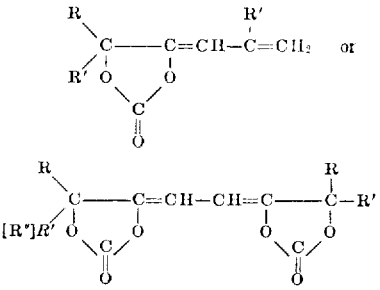

wherein R and R' are the same or different and are alkyl groups containing up to 6 carbon atoms, phenyl, tolyl or cycloalkyl groups of 6 to 12 carbon atoms.

4. A process as defined in claim 1 wherein R and R' are alkyl groups containing up to 6 carbon atoms.

5. A cyclic carbonate as defined in claim 3 wherein R and $R_2$ are alyky groups containing up to 6 carbon atoms.

References Cited

UNITED STATES PATENTS 3,082,216   3/1963   Dimroth et al. _____ 260—340.2

OTHER REFERENCES

German Printed Application (Auslegeschrift) No. 1,145,632, published Mar. 21, 1963, 4 pages.

JOHN D. RANDOLPH, Primary Examiner

U.S. Cl. X.R.

260—77.5, 340.2, 617, 618, 635

UNITED STATES PATENT OFFICE
CERTIFICATE OF CORRECTION   Page 1

Patent No. 3,541,087     Dated November 17, 1970

Inventor(s) Robert J. Tedeschi and George L. Moore

It is certified that error appears in the above-identified patent and that said Letters Patent are hereby corrected as shown below:

should read --
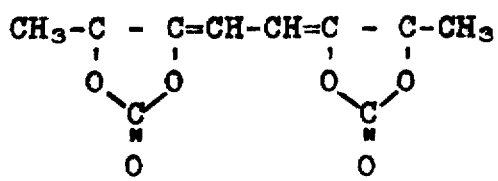
--;

line 44, "$R_2$" should read -- $R'$ --.

Col. 8, line 5, in the formula " $R^2$ " should read

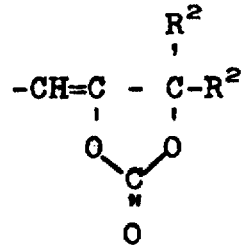

-- $R^2$ --;

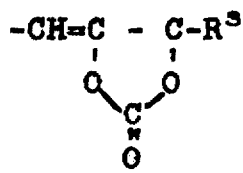

line 41, "$R_2$" should read -- $R'$ --.

SIGNED AND
SEALED
MAR 16 1971

(SEAL)
Attest:

Edward M. Fletcher, Jr.
Attesting Officer

WILLIAM E. SCHUYLER
Commissioner of Patents

UNITED STATES PATENT OFFICE
CERTIFICATE OF CORRECTION  Page 2

Patent No. 3,541,087    Dated November 17, 1970

Inventor(s) Robert J. Tedeschi and George L. Moore

It is certified that error appears in the above-identified patent and that said Letters Patent are hereby corrected as shown below:

Col. 6, line 30, in the formula " 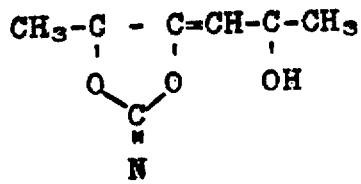 "

should read -- 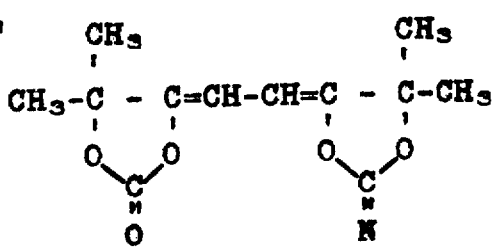 --;

line 72, after "melted" should be inserted -- at --.

Col. 7, line 5, in the formula "

$$CH_3-\underset{\underset{\underset{N}{\overset{\|}{C}}}{\overset{O}{\diagdown}\diagup}O}{\overset{CH_3}{\underset{|}{C}}} - C=CH-CH=\underset{\underset{\underset{N}{\overset{\|}{C}}}{\overset{O}{\diagdown}\diagup}O}{\overset{}{C}} - \overset{CH_3}{\underset{|}{C}}-CH_3$$

"